May 2, 1939.  C. T. HUMBER  2,156,590
MEANS FOR PREVENTING RETROGRADE MOVEMENT OF A VEHICLE
Filed May 3, 1937
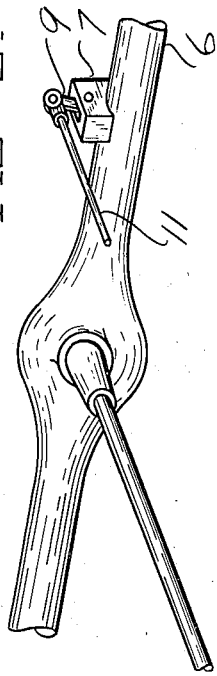
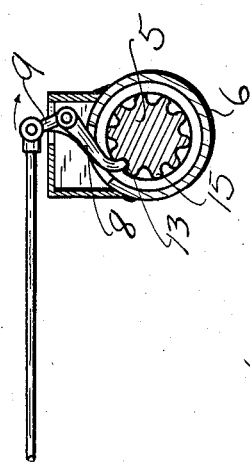
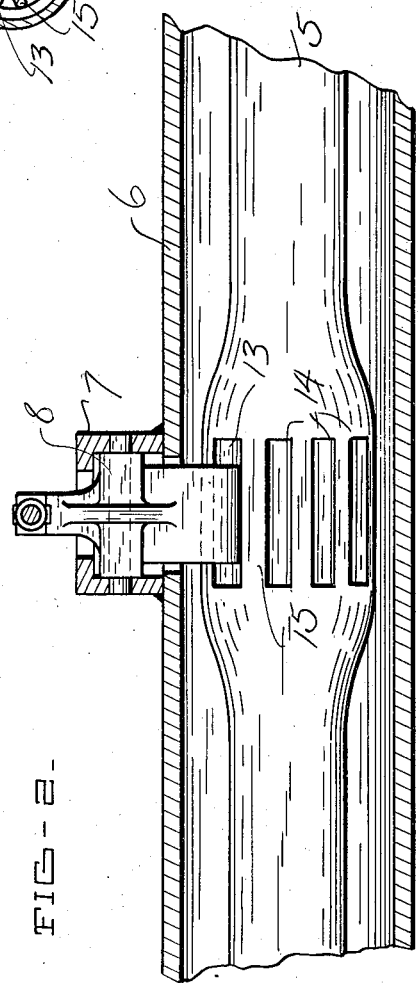
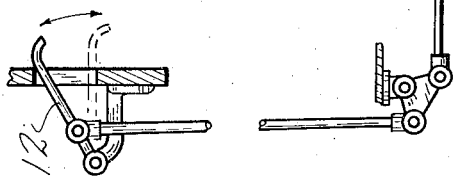
INVENTOR.
CHARLES THOMAS HUMBER
BY
ATTORNEYS.

Patented May 2, 1939

2,156,590

UNITED STATES PATENT OFFICE 2,156,590

MEANS FOR PREVENTING RETROGRADE MOVEMENT OF A VEHICLE

Charles T. Humber, Oakland, Calif.

Application May 3, 1937, Serial No. 140,548

1 Claim. (Cl. 188—30)

This invention relates to improvements in means for preventing retrograde movement of a vehicle.

The principal object of this invention is to provide a simple device which will lock a vehicle against backing down hill after the vehicle has come to a stop.

A further object of this invention is to provide a device of this character which may be employed with a motor vehicle without materially altering its construction.

A further object of this invention is to produce a device of this character which is simple in construction, economical to manufacture and efficient in operation.

Other objects and advantages will be apparent during the course of the following description.

In the accompanying drawing forming a part of this specification and in which like numerals are employed to designate like parts throughout the same, Fig. 1 is a side elevation of the linkage controlling my device, which is shown in cross section;

Fig. 2 is an enlarged detail side elevation of the rear axle of a vehicle, having my device applied thereto, the housing being shown in cross section; and Fig. 3 is a preferred method of attaching my device to the vehicle.

The ordinary motor vehicle must be held on a grade against backing by the use of brakes upon the wheels. If these brakes become released in any manner the vehicle is liable to cause damage, and many serious accidents have occurred. Further, when moving up a grade it may be necessary to stop, and in order to get away the engine must be speeded and the brakes released as the clutch is engaged. This is a difficult operation for many drivers, and, therefore, I have produced a device which will overcome these difficulties.

In the accompanying drawing wherein for the purpose of illustration is shown a preferred embodiment of my invention, the numeral 5 designates a rear axle of a motor vehicle, showing a portion thereof, and the numeral 6 the housing supporting the axle. Upon the housing I place a casting 7, in which is journalled a dog 8 having an upstanding arm 9 extending out of the casting 7 and connected to a pull lever 11. This pull lever is in turn connected to linkage so arranged that a lever 12 when moved will in turn move the dog 8. This dog has its nose 13 in alignment with depressions 14 formed in the axle 5. These depressions virtually form teeth 15 against which the nose of the dog may press. The result of this construction is that when the vehicle comes to rest the operator may move the lever from the dotted line position shown in Fig. 1 to the full line position, which will actuate the linkage and the pull rod 11 to move the nose of the dog into engagement with the openings in the axle. Should the vehicle start to move in a reverse direction its movement will be arrested by the engagement of the nose of the dog with the teeth 15, and consequently, the brakes may be entirely released without the vehicle moving backwards. In getting away and in going up a grade the driver may entirely release the brakes and drive off in the usual manner.

It will thus be sen that my device will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with a motor vehicle having a rotating axle, a portion of said axle being of greater diameter than the remainder of said axle, teeth formed in the enlarged portion of said axle, said teeth having a rounded contour, a pivoted dog mounted adjacent said axle, whereby the nose of said dog may engage the teeth of said axle, the nose of said dog being rounded to engage the rounded contour of said teeth, and remote means for actuating said dog.

CHARLES T. HUMBER.